US010389189B2

(12) United States Patent
Xu

(10) Patent No.: US 10,389,189 B2
(45) Date of Patent: Aug. 20, 2019

(54) DISC-TYPE MAGNETISM-INCREASING DC GENERATOR

(71) Applicant: Zhankui Xu, Shenyang (CN)

(72) Inventor: Zhankui Xu, Shenyang (CN)

(*) Notice: Subject to any disclaimer, the term of this patent is extended or adjusted under 35 U.S.C. 154(b) by 0 days.

(21) Appl. No.: 15/830,012

(22) Filed: Dec. 4, 2017

(65) Prior Publication Data

US 2018/0123408 A1 May 3, 2018

Related U.S. Application Data

(63) Continuation of application No. PCT/CN2016/000177, filed on Mar. 31, 2016.

(30) Foreign Application Priority Data

Jun. 15, 2015 (CN) .......................... 2015 1 0324790

(51) Int. Cl.

| | |
|---|---|
| ***H02K 1/22*** | (2006.01) |
| ***H02K 1/17*** | (2006.01) |
| ***H02K 53/00*** | (2006.01) |
| ***H02K 3/04*** | (2006.01) |
| ***H02K 7/00*** | (2006.01) |
| ***H02K 21/04*** | (2006.01) |
| ***H02K 21/26*** | (2006.01) |
| *H02K 21/24* | (2006.01) |

(52) U.S. Cl.

CPC ................ *H02K 1/17* (2013.01); *H02K 1/22* (2013.01); *H02K 3/04* (2013.01); *H02K 7/003* (2013.01); *H02K 21/04* (2013.01); *H02K 21/26* (2013.01); *H02K 53/00* (2013.01); *H02K 21/24* (2013.01)

(58) Field of Classification Search

CPC .. H02K 1/17; H02K 1/22; H02K 3/04; H02K 7/003

USPC .......................................................... 310/177

See application file for complete search history.

(56) References Cited

U.S. PATENT DOCUMENTS 4,864,174 A * 9/1989 Kawamura ............. F01D 15/10 310/216.055
5,917,248 A * 6/1999 Seguchi ................... B60K 6/26 290/31
2011/0074231 A1* 3/2011 Soderberg ................. H01F 3/10 310/44
2012/0267974 A1* 10/2012 Lebenbom ............... H02K 1/14 310/113

* cited by examiner

*Primary Examiner* — Naishadh N Desai

(74) *Attorney, Agent, or Firm* — Wayne & Ken, LLC; Tony Hom

(57) ABSTRACT

The disc-type magnetism-increasing DC generator is a pure magnetic DC generator composed of a drive motor and a DC generator, as well as a disc-brush conductive output device; the DC generator stator is composed of a permanent magnetic source and a magnetism-increasing coil casing; the rotor is composed of a generator disc and a shaft, as well as conductive inner-shaft terminals; the drive motor and the DC generator run on the same shaft; when the motor rotates after it is electrified, the generator disc rotor cuts the magnetic line of force and generates electricity; and a current is generated when an electrical equipment consumes the electricity; when the current passes the magnetism-increasing coil, it generates a magnetic potential, enhancing the magnetic field strength of the DC generator's magnetic source, thereby increasing magnetic flux and output power of the DC generator.

6 Claims, 6 Drawing Sheets

DISC-TYPE MAGNETISM-INCREASING DC GENERATOR

TECHNICAL FIELD

Figure 1:
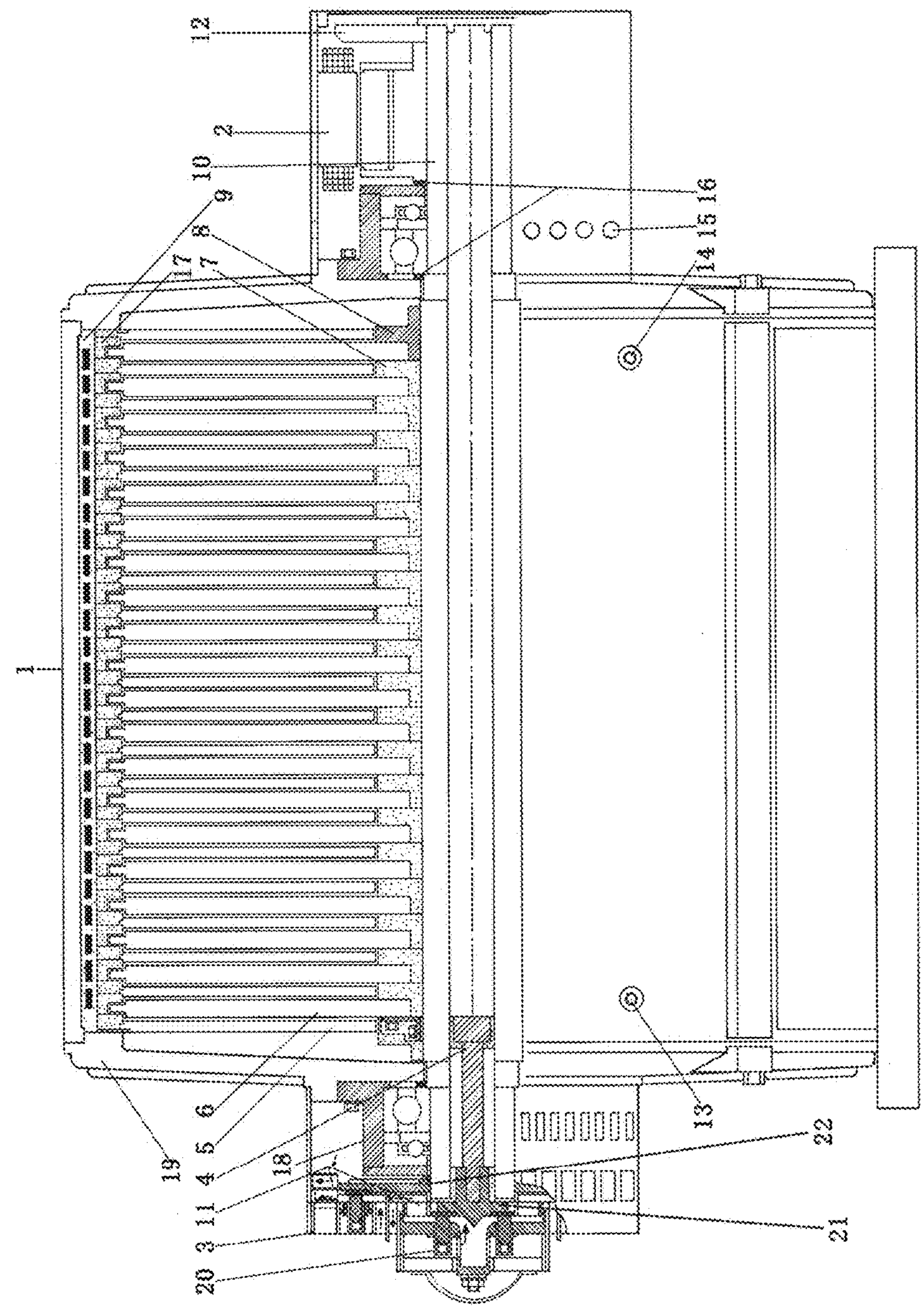

Pure magnetic energy DC generator that can meet electricity demand for industries, agriculture, for civil use and transportation.

BACKGROUND TECHNOLOGY

Nuclear power generation, hydroelectric generation, thermal power generation and other power generation methods depend on energy sources; they consume energy sources and pollute the environment, due to which their usage is inconvenient; at present, there is no pure magnetic energy DC generator.

INVENTION CONTENTS

The disc-type magnetism-increasing DC generator is a pure magnetic energy DC generator a drive motor and DC generator, as well as a disc brush conductive output device, and is a high-energy and high-quality DC generator.

Theory: The disc-type magnetism-increasing DC generator comprises a DC generator, a disc-brush conductive output device and a drive motor. the DC generator comprises a stator and a rotor; wherein the stator comprises a plurality of permanent magnetic discs, a plurality of ceramic structural insulation gaskets, a magnetism-increasing coil and a casing; the plurality of permanent magnetic discs are arranged on the plurality of ceramic structural insulation gaskets one by one; the plurality of permanent magnetic discs and the plurality of ceramic structural insulation gaskets are arranged on the casing; the magnetism-increasing coil is formed by convolving aluminum strips or copper strips or wires, and then being cast into the casing with insulating structure ceramics; the magnetism-increasing coil comprises a input terminal and a output terminal;

the rotor comprises a plurality of generator discs, a plurality of ceramic structural insulation generator disc holders and a non-magnetic hollow conductive metal shaft; the plurality of generator discs are arranged on the plurality of ceramic structural insulation generator disc holders one by one; the plurality of generator discs and the plurality of ceramic structural insulation generator disc holders are arranged on the non-magnetic hollow conductive metal shaft; the non-magnetic hollow conductive metal shaft is provided with a conductive terminal therein;

wherein the plurality of permanent magnetic discs are arranged staggerly with the plurality of generator discs layer by layer;

Wherein each of the plurality of generator discs comprises an aluminum alloy generator disc, an copper alloy conductive ring, and a ceramic structural insulation bus;

the aluminum alloy generator disc is connected to the copper alloy conductive ring, and the copper alloy conductive ring is connected to the ceramic structural insulation bus; wherein the insulation bus is provided with a positive connecting terminal, and the aluminum alloy generator disc is provided with a negative connecting terminal; the positive connecting terminal of one of the plurality of generator discs is connected to the negative connecting terminal of next one of the plurality of generator discs, so as to form a generator disc series circuit; the positive connecting terminal of last one of the plurality of generator discs is connected to the conductive terminal;

the negative connecting terminal of last one of the plurality of generator discs is connected to a non-magnetic conductive metal disc holder at bottom; the non-magnetic conductive metal disc holder is connected to the non-magnetic hollow conductive metal shaft, and the non-magnetic hollow conductive metal shaft is connected to the disc brush conductive output device, so as to output negative power from the DC generator;

the drive motor is configured separately; the drive motor comprises a rotor of the drive motor, a bearing bush and a stator of the drive motor; wherein the rotor of the drive motor is also arranged on the non-magnetic hollow conductive metal shaft; the bearing bush and the stator of the drive motor are provided on a DC generator end cap;

the disc brush conductive output device comprises a positive conductive disc, a negative conductive disc, an electric brush, a conductive brush disc holder and a plurality of fans; wherein, the positive conductive disc and the negative conductive disc are provided with a conductive friction disk thereon;

the disc brush conductive output device is configured on a DC generator shaft head;

the positive conductive disc is connected to the conductive terminal, and the negative conductive disc is connected to the non-magnetic hollow conductive metal shaft;

when the drive motor rotates after being electrified, the plurality of generator discs cut magnetic lines of force, so as to generate current;

the current is output by the generator disc series circuit, and then input to the input terminal after passing the conductive terminal and the disc brush conductive output device, and the output terminal outputs direct current;

the output terminal and a negative power output terminal of the disc brush conductive output device are connected to an electrical equipment; when the current passes the magnetism-increasing coil, it a generates magnetic potential; the magnetic potential is added to the DC generator's magnetic source, enhancing its magnetic field strength and enlarging the magnetic flux, thus increasing the current generated by the DC generator; such a coil in a casing-based magnetism-increasing method is called self-increasing; magnetism-increasing coil-based magnetism-increasing current can also be separated from current of the electrical equipment; a magnetism-increasing current can be specially set for the magnetism-increasing coil; such a magnetism-increasing method is called external-increasing;

the current derived from the DC generator can be directly applied on electrical equipment; if the above two magnetism-increasing methods are applied in one generator, it is called compound-increasing. a control device shall be installed in front of the drive motor and the magnetism-increasing coil to adjust a number of revolutions of the generator, V=Blu [V], and adjust a number of coil turns of the magnetism-increasing coil or the current, magnetic potential=the number of turns×the current (A); a two-way adjustment can meet requirements of various electrical equipment.

The thinner the permanent magnetic disc of the disc-type magnetism-increasing DC generator, the stronger and better magnetic field strength; it depends on the permanent magnetic disc's magnetic field strength and work requirements; the thickness of the aluminum alloy generator disc shall be determined based on the strength of the magnetic field in the two permanent magnetic discs.

The vertical disc-type magnetism-increasing DC generator base is equipped with three access holes, and the bearing at the bottom of the mid and small-sized DC generators can be taken out for repair; people can enter large-sized DC generators to repair them.

While installing the generator disc, it shall be rotated at a 90° angle between layers; the angle mounting connection helps ensure dynamic balance.

The bearing bush is equipped with screw holes; to replace the bearing, push out the bearing bush with a fastening screw.

It is to be noted that for the disc-type magnetism-increasing DC generator, except for the permanent magnetic disc and magnetic materials required for the drive motor, all other materials shall be non-magnetic.

BENEFICIAL EFFECT

The disc-type magnetism-increasing DC generator is small in size, lightweight and generates large amount of power, and can come in numerous models and specifications; it can meet electricity demand in industry, agriculture, for civil use, aircrafts, ships, automobiles and various transportation modes.

The disc-type magnetism-increasing DC generator is convenient to use and maintain; the generator has a fully-sealed structure that doesn't require maintenance, and the bearing and electric brush located outside the generator only require period replacement.

Direct current is a high-energy universal power supply system; DC electrical equipment are small in size, have quick response, low noise, long life and stable performance; at present, DC is used much more than AC; using the disc-type magnetism-increasing DC generator is as convenient as using a mobile DC power supply, which can be installed anywhere.

The use of disc-type magnetism-increasing DC generator and the use of direct current, is financially viable, keeps the environment clean and is a stable system; the unparalleled excellent performance of the disc-type magnetism-increasing DC generator can enhance development.

INSTRUCTIONS ON ATTACHED FIGURES

FIG. 1: [Horizontal] Disc-Type Magnetism-increasing DC Generator: 1. DC generator; 2. Drive motor; 3. Disc brush conductive output device; 4. Conductive terminal inside the shaft; 5. Permanent magnetic disc; 6. Generator disc; 7. Ceramic structural insulation disc holder; 8. Non-magnetic conductive disc holder; 9. Casing with insulated magnetism-increasing coil; both ends of the coil have connecting terminals; 10. Generator shaft (non-magnetic hollow conductive metal shaft, with conductive terminal inside the shaft); 11. Fans; there are three fans in all, namely the positive fan, negative fan and motor fan; the positive fan is fixed onto the shaft head; the negative fan and the motor fan are fixed on the conductive disc connecting to the shaft; 12. Exhaust fan; 13. input terminal; 14. output terminal; 15. Air inlet; 16. Seal gasket; 17. Ceramic structural insulation gasket; 18. Bearing bush; (there is a deep-groove bearing and thrust bearing inside, with the bearing bush fixed on the generator end cap; there are screw holes for the fastening screws; while replacing the bearing, install the fastening screw on the screw hole, push out the bearing bush and replace the bearing); 19. DC generator end cap; 20. Electric brush; 21. Positive conductive disc; 22. Negative conductive disc.

Figure 2:
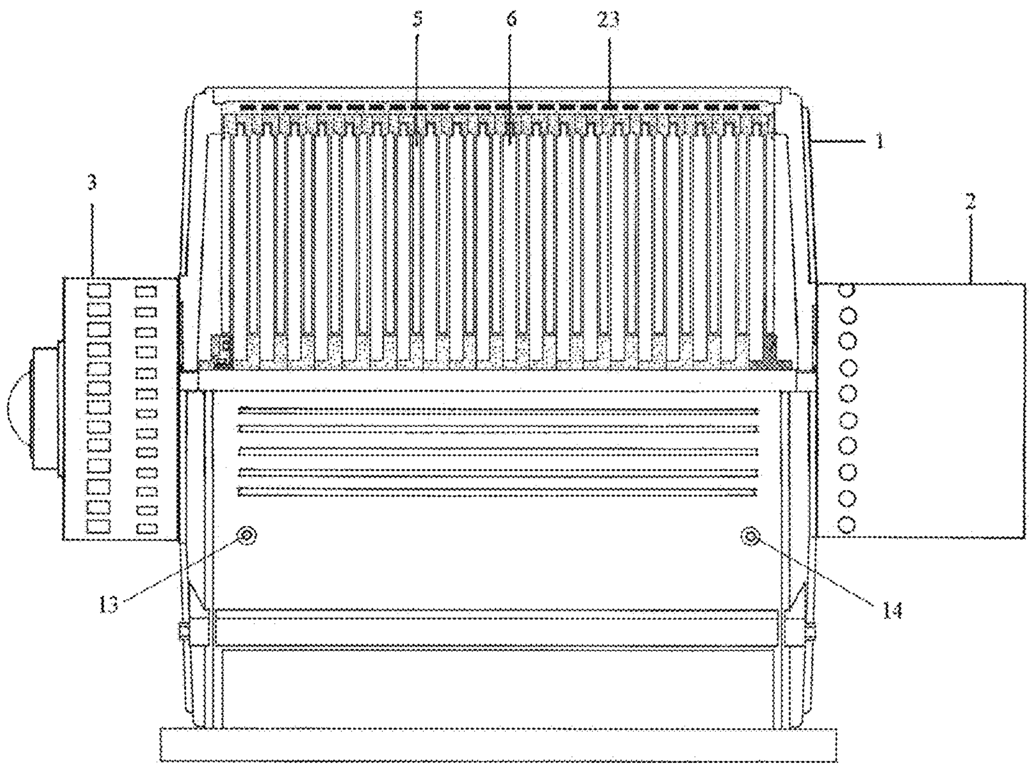

FIG. 2: Disc-Type Magnetism-increasing DC Generator FIG. 1 Summary Structural Diagram; 1. DC generator; 2. Drive motor; 3. Disc brush conductive output device; 5. Permanent magnetic disc; 6. Generator disc; 23. Magnetism-increasing coil.

Figure 3:
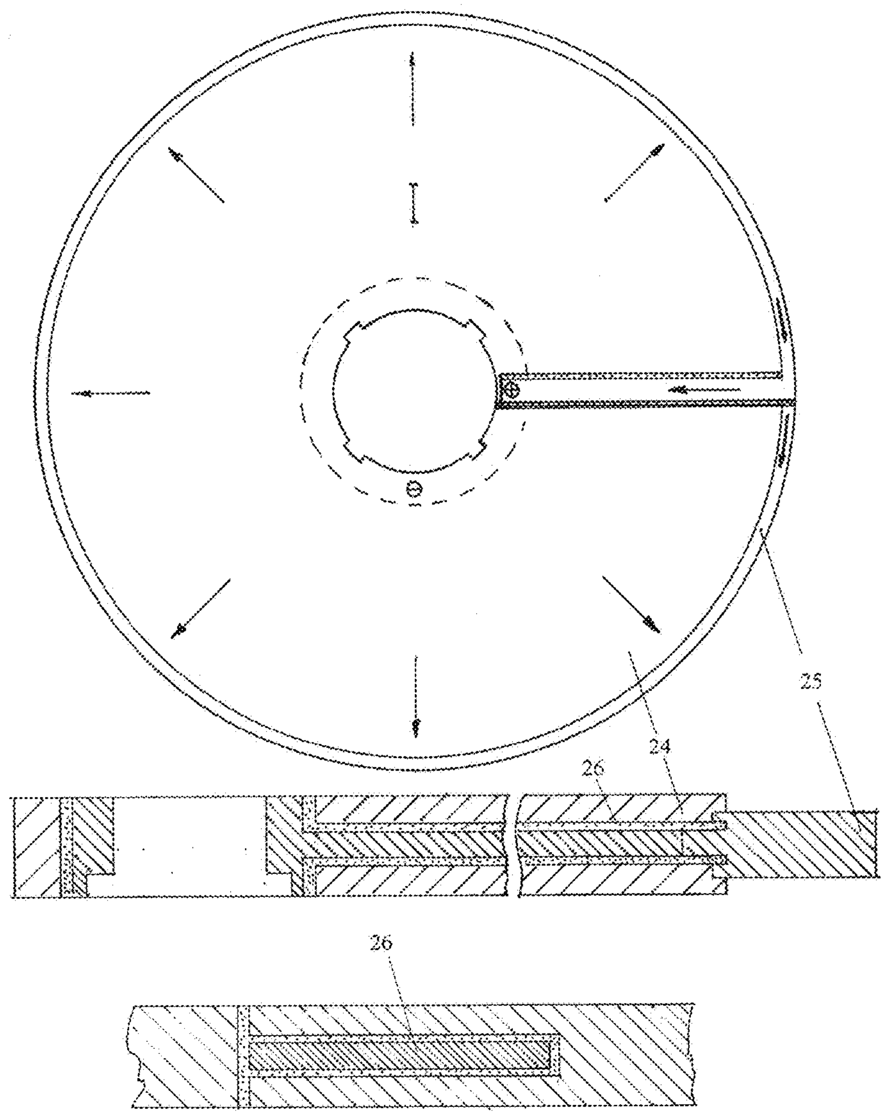

FIG. 3: Schematic Diagram of Generator and Partial Cross-section View; 24. Aluminum alloy generator disc: 25. Copper alloy conductive ring; 26. Ceramic structural insulation bus; (□□) are positive and negative connecting terminals.

Figure 4:
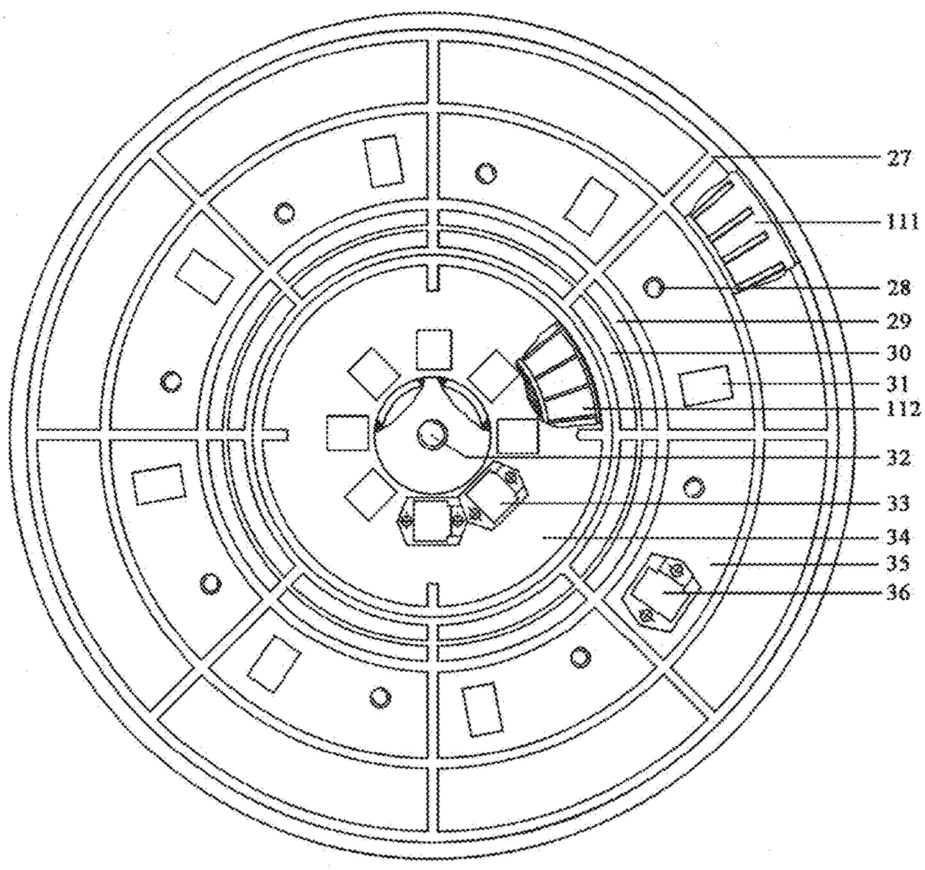

FIG. 4: Partial Cross-sectional View of Disc Brush Conductive Output Device; 27. High-intensity insulation support; 111. Negative electric brush fan; 28. Negative connecting terminal; 29. Negative vent; 30. Positive vent; 31. Electric brush vacancy; 112. Positive brush fan; 32. Positive connecting terminal; 33. Positive power output electric brush; 34. Positive conductive brush disc holder; 35. Negative conductive brush disc holder; 36. Negative power output electric brush.

Figure 5:
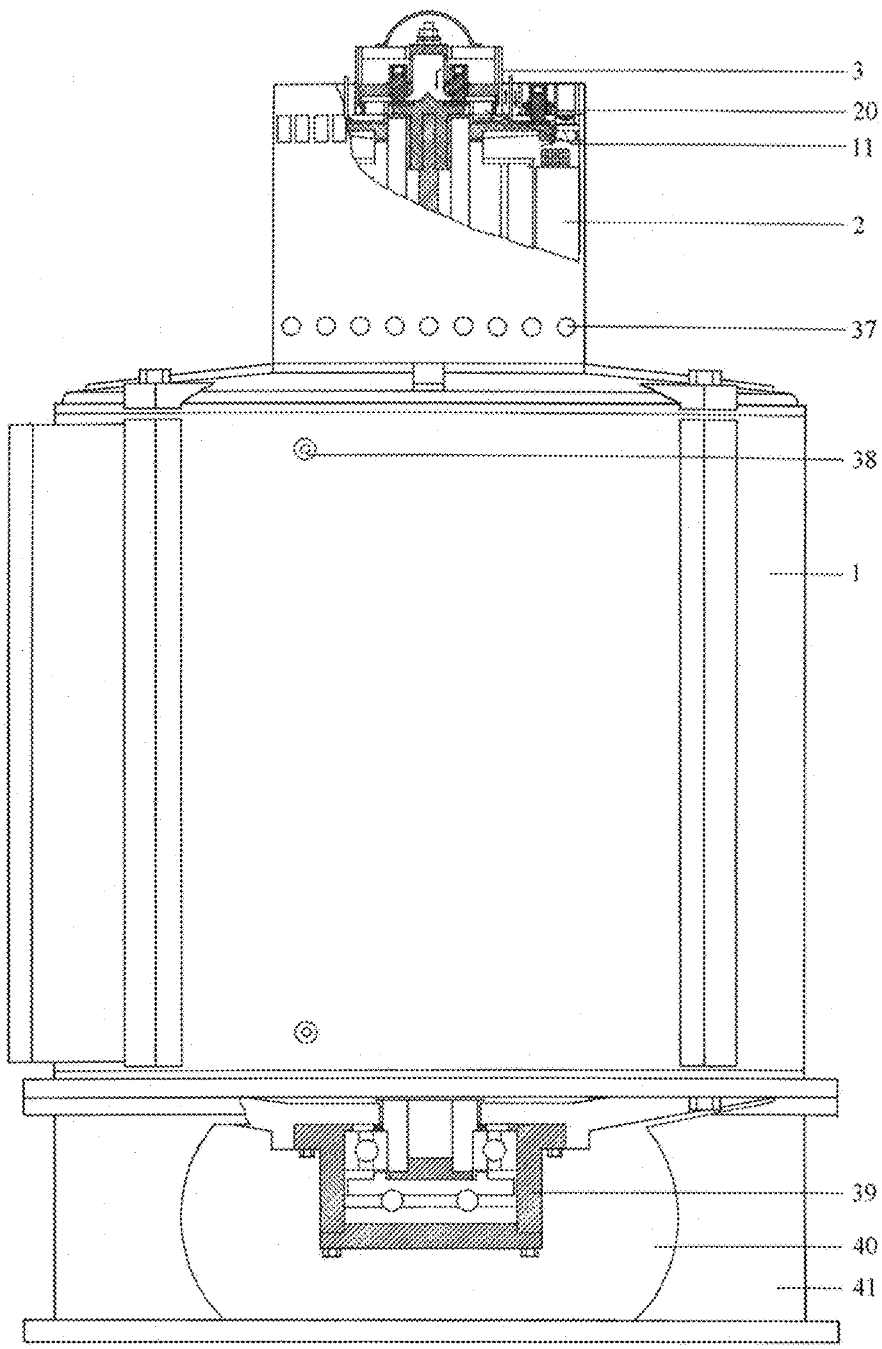

FIG. 5: (Vertical and Horizontal) Disc-Type Magnetism-increasing DC Generator; 3. Disc brush conductive output device; 20. Electric brush: 11. Fans; there are three fans in all, namely the positive fan, negative fan and motor fan; the positive fan is fixed onto the shaft head; the negative fan and the motor fan are fixed on the conductive disc connecting to the shaft; 2. Drive motor; 37. Air inlet; 38. Magnetism-increasing coil connecting terminal; 1. DC generator; 39. Bearing bush; 40. Access hole; 41. Vertical base.

Figure 6:
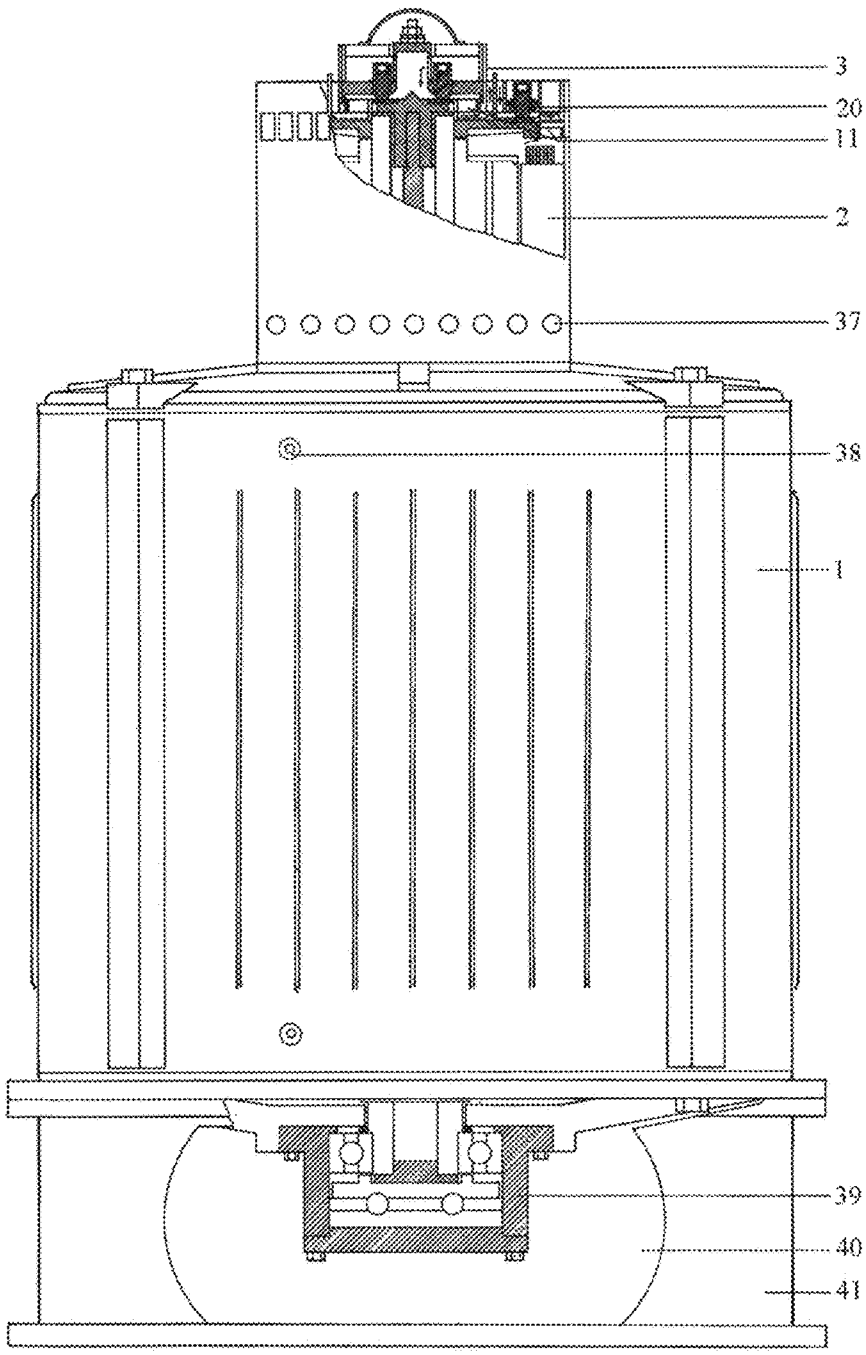

FIG. 6: (Vertical) Disc-Type Magnetism-increasing DC Generator; 3. Disc brush conductive output device; 20. Electric brush; 11. Fans: There are three fans in all, namely the positive fan, the negative fan and the motor fan; the positive fan is fixed onto the shaft head; the negative fan and the motor fan are fixed on the conductive disc connecting to the shaft; 2. Drive motor; 37. Air inlet; 38. Magnetism-increasing coil connecting terminal; 1. DC generator; 39. Bearing bush; 40. Access hole; 41. Vertical base.

DETAILED IMPLEMENTATION METHOD

Implementation Example 1

As shown in FIG. 1, The disc-type magnetism-increasing DC generator comprises a DC generator 1, a disc-brush conductive output device 3 and a drive motor 2. the DC generator 1 comprises a stator and a rotor; wherein the stator comprises a plurality of permanent magnetic discs 5, a plurality of ceramic structural insulation gaskets 17, a magnetism-increasing coil 23 and a casing 9; the plurality of permanent magnetic discs 5 are arranged on the plurality of ceramic structural insulation gaskets 17 one by one; the plurality of permanent magnetic discs 5 and the plurality of ceramic structural insulation gaskets 17 are arranged on the casing 9; the magnetism-increasing coil 23 is formed by convolving aluminum strips or copper strips or wires, and then being cast into the casing with insulating structure ceramics; the magnetism-increasing coil 23 comprises a input terminal 13 and a output terminal 14;

the rotor comprises a plurality of generator discs 6, a plurality of ceramic structural insulation generator disc holders 7 and a non-magnetic hollow conductive metal shaft 10; the plurality of generator discs 6 are arranged on the plurality of ceramic structural insulation generator disc holders 7 one by one; the plurality of generator discs 6 and the plurality of ceramic structural insulation generator disc holders 7 are arranged on the non-magnetic hollow conductive metal shaft 10; the non-magnetic hollow conductive metal shaft 10 is provided with a conductive terminal therein;

wherein the plurality of permanent magnetic discs 5 are arranged staggerly with the plurality of generator discs 6 layer by layer;

Wherein each of the plurality of generator discs 6 comprises an aluminum alloy generator disc, an copper alloy conductive ring, and a ceramic structural insulation bus;

the aluminum alloy generator disc 24 is connected to the copper alloy conductive ring 25, and the copper alloy conductive ring 25 is connected to the ceramic structural insulation bus 26;

wherein the ceramic structural insulation bus 26 is provided with a positive connecting terminal 32, and the aluminum alloy generator disc is provided with a negative connecting terminal 28;

the positive connecting terminal 32 of one of the plurality of generator discs is connected to the negative connecting terminal 28 of next one of the plurality of generator discs 6, so as to form a generator disc series circuit; the positive connecting terminal 32 of last one of the plurality of generator discs 6 is connected to the conductive terminal; the negative connecting terminal 28 of last one of the plurality of generator discs 6 is connected to a non-magnetic conductive metal disc holder 8 at bottom; the non-magnetic conductive metal disc holder 8 is connected to the non-magnetic hollow conductive metal shaft 10, and the non-magnetic hollow conductive metal shaft 10 is connected to the disc brush conductive output device 3, so as to output negative power from the DC generator 1;

the drive motor 2 is configured separately; the drive motor 2 comprises a rotor of the drive motor, a bearing bush and a stator of the drive motor; wherein the rotor of the drive motor is also arranged on the non-magnetic hollow conductive metal shaft 10; the bearing bush and the stator of the drive motor are provided on a DC generator end cap 19;

the disc brush conductive output device 3 comprises a positive conductive disc 21, a negative conductive disc 22, an electric brush 20, a conductive brush disc holder and a plurality of fans 11;

wherein, the positive conductive disc 21 and the negative conductive disc 22 are provided with a conductive friction disk thereon;

the disc brush conductive output device 3 is configured on a DC generator shaft head;

the positive conductive disc 21 is connected to the conductive terminal, and the negative conductive disc 22 is connected to the non-magnetic hollow conductive metal shaft 10;

when the drive motor 2 rotates after being electrified, the plurality of generator discs 6 cut magnetic lines of force, so as to generate current; the current is output by the generator disc series circuit, and then input to the input terminal after passing the conductive terminal and the disc brush conductive output device 3, and the output terminal outputs direct current;

the output terminal coil and a negative power output terminal of the disc brush conductive output device 3 are connected to an electrical equipment; when the current passes the magnetism-increasing coil 23, it a generates magnetic potential, the magnetic potential of the magnetism-increasing coil 23 is added to the DC generator magnetic source, enhancing the magnetic field strength of the DC generator magnetic source, and enlarging the magnetic flux, thus increasing the current generation of the DC generator 1; such a coil in a casing-based magnetism-increasing method is called self-increasing a control device shall be installed in front of the disc-type magnetism-increasing DC generator, to adjust a number of revolutions of the generator, V=Blu [V]; this can help adjusting an output power of the disc-type magnetism-increasing DC generator; Magnetic potential=a number of coil turns×Current (A); it is necessary to ensure that the number of coil turns meet the design and usage requirements of the electrical equipment.

For example: Attached FIG. 1 of the instructions: 1:10, (1) The outer diameter of the magnetic disc in the generator's permanent magnetic source is 1050 mm, the inner diameter is 280 mm, and the average area is 0.768 square meters; there are 21 permanent magnetic discs in all, and the magnetic energy area is 16 square meters; the DC generator has no backward electromagnetic force, hence, 5.5 kw or 7.5 kw motors are selected as drive motors; this can meet the operation needs of the drive DC generator; the magnetic energy area of the drive motor is 0.05 square meters; the magnetic energy area of the generator is over 300 times greater than that of the drive motor; (2) The magnetic potential generated by load is re-injected into the permanent magnetic source, which again increases the generator energy; (3) The diameter of the generator disc inside the generator disc rotor is 1050 mm, and the thickness is 15 mm to 20 mm; 20 generator discs can meet the maximum magnetic energy power generation demand of the DC generator; the DC generator operates co-axially with the drive motor, while the DC generator's power generation is over 300 times greater than the drive motor's power consumption, and the output power of the DC generator is much greater than the power consumed by the drive motor; explanation: (1) The magnetic energy area of the generator is 16 square meters: the magnetic energy area of the generator is over 300 times greater than that of the drive motor, which is about 1500 kw, this is the initial generation area of the generator; (2) Magnetic potential=Coil turns×Current (A); assuming that the magnetism-increasing coil has 20 turns, and the load current is 4.5 (A) per kw; magnetic potential=load power×4.5 (A)×20 turns; it can be seen from it that the power generation by the magnetism-increasing coil is greater than the load power consumption; the number of turns of the magnetism-increasing coil can change the output power of the generator;

(3) V=Blu [V], controlled by a controller, the disc-type magnetism-increasing DC generator steadily operates at a set value, and the output power can be changed by changing the set value; the tremendous energy inside the generator is based on the power generation area and power generation of the magnetism-increasing coil; the maximum output power of the generator in FIG. 1 can exceed 1500 kw; (the generator does not violate the energy conservation law) (4) The generator in FIG. 1 does not have a backward electromagnetic force, hence, 5.5 kw or 7.5 kw motors can be used as the drive motors to meet the power generation demand of the generator in FIG. 1.

FIG. 2 is the summary structural diagram of disc-type magnetism-increasing DC generator in FIG. 1; it is composed of a DC generator 1, drive generator 2, and disc brush conductive output device 3; the permanent magnetic disc 5, generator disc 6 and magnetism-increasing coil 23 are inside the DC generator.

FIG. 3 is the schematic diagram of the generator disc and the partial cross-section view; the aluminum alloy generator disc 24, which is connected to the copper alloy conductive ring 2, and the conductive ring 2 is connected to the insulation bus 3; the insulation bus 3 is equipped with a positive connecting terminal 32, while the aluminum alloy generator disc 24 is equipped with a negative connecting terminal 28; here, aluminum has the best power generation performance, and copper has the best conductive performance; the aluminum alloy generator disc 24 rotates and cuts the magnetic line of force, generating current, while the current is input to the insulation bus 3 after passing the conductive ring 2, and is input to the negative connecting terminal 28 of the next one of the plurality of generator discs 6, from the positive connecting terminal 32.

In FIG. 1, the disc brush conductive output device 3 (including positive output device and negative output device), comprises the positive conductive disc 21 and the negative conductive disc 22 (with a conductive friction disk thereon), the electric brush 20, the conductive brush disc holder, connecting terminals and fans 11; while the positive conductive disc 21 is connected to the conductive terminals inside the shaft 10, the negative conductive disc 22 is connected to the shaft 10, the electric brush 20 is installed on the conductive brush disc holder, and the disc holder is fixed onto the casing 9 by insulating support 27; the conductive brush disc holder is equipped with connecting terminals and 3 fans, with a positive fan installed on the shaft head, and a negative fan and motor fan installed on the negative conductive disc; when the generator 1 rotates to generate power, the current passes through the conductive disc, electric brush 20, conductive brush disc holder and connecting terminals, outputting direct current; FIG. 4 is Partial Cross-sectional View of Disc Brush Conductive Output Device 3.

Implementation Example 2

As shown in FIG. 5, the (vertical and horizontal) disc-type magnetism-increasing DC generator is made by making changes in the horizontal disc-type magnetism-increasing DC generator in FIG. 1; differing from the horizontal disc-type magnetism-increasing DC generator in FIG. 1, the vertical base 41 is installed on the negative side of the DC generator 1, while the drive motor 2 is installed on the positive side of the DC generator (The drive motor is a separate structure); the rotor is installed on the DC generator rotation shaft, and the stator is fixed on the generator end cap; the disc brush conductive output device 3 is installed on the extension of the drive motor casing; (the DC generator shaft is extended accordingly), the positive conductive disc is connected to the conductive terminals inside the shaft, and the negative conductive disc is connected to the shaft; the end cap at the bottom is thickened, to ensure the load-bearing capacity of the end cap at the bottom meets usage requirements; the vertical base of the DC generator is equipped with 3 access holes (access hole 40); the rest is the same with the (horizontal) disc-type magnetism-increasing DC generator in FIG. 1.

Implementation Example 3

As shown in FIG. 6, the (vertical) disc-type magnetism-increasing DC generator is made by removing the horizontal base of the (vertical and horizontal) disc-type magnetism-increasing DC generator in FIG. 5.

The invention claimed is:

1. A disc-type magnetism-increasing DC generator, comprising:

a drive motor, a DC generator and a disc-brush conductive output device; wherein, the DC generator comprises a stator and a rotor;

wherein the stator comprises a plurality of permanent magnetic discs, a plurality of ceramic structural insulation gaskets, a magnetism-increasing coil and a casing; the plurality of permanent magnetic discs are arranged on the plurality of ceramic structural insulation gaskets one by one; the plurality of permanent magnetic discs and the plurality of ceramic structural insulation gaskets are arranged on the casing; the magnetism-increasing coil is formed by convolving aluminum strips or copper strips or wires, and then being cast into the casing with insulating structure ceramics; the magnetism-increasing coil comprises a input terminal and a output terminal;

the rotor comprises a plurality of generator discs, a plurality of ceramic structural insulation generator disc holders and a non-magnetic hollow conductive metal shaft the plurality of generator discs are arranged on the plurality of ceramic structural insulation generator disc holders one by one; the plurality of generator discs and the plurality of ceramic structural insulation generator disc holders are arranged on the non-magnetic hollow conductive metal shaft the non-magnetic hollow conductive metal shaft is provided with a conductive terminal therein;

wherein the plurality of permanent magnetic discs are arranged staggerly with the plurality of generator discs layer by layer;

wherein each of the plurality of generator discs comprises an aluminum alloy generator disc, an copper alloy conductive ring, and a ceramic structural insulation bus;

the aluminum alloy generator disc is connected to the copper alloy conductive ring, and the copper alloy conductive ring is connected to the ceramic structural insulation bus; wherein the insulation bus is provided with a positive connecting terminal, and the aluminum alloy generator disc is provided with a negative connecting terminal; the positive connecting terminal of one of the plurality of generator discs is connected to the negative connecting terminal of next one of the plurality of generator discs, so as to form a generator disc series circuit; the positive connecting terminal of last one of the plurality of generator discs is connected to the conductive terminal;

the negative connecting terminal of last one of the plurality of generator discs is connected to a non-magnetic conductive metal disc holder at bottom; the non-magnetic conductive metal disc holder is connected to the non-magnetic hollow conductive metal shaft, and the non-magnetic hollow conductive metal shaft is connected to the disc brush conductive output device, so as to output negative power from the DC generator;

the drive motor is configured separately; the drive motor comprises a rotor of the drive motor, a bearing bush and a stator of the drive motor; wherein the rotor of the drive motor is also arranged on the non-magnetic hollow conductive metal shaft; the bearing bush and the stator of the drive motor are provided on a DC generator end cap;

the disc brush conductive output device comprises a positive conductive disc, a negative conductive disc, an electric brush, a conductive brush disc holder and a plurality of fans; wherein, the positive conductive disc and the negative conductive disc are provided with a conductive friction disk thereon;

the disc brush conductive output device is configured on a DC generator shaft head;

the positive conductive disc is connected to the conductive terminal, and the negative conductive disc is connected to the non-magnetic hollow conductive metal shaft;

when the drive motor rotates after being electrified, the plurality of generator discs cut magnetic lines of force, so as to generate current;

the current is output by the generator disc series circuit, and then input to the input terminal after passing the conductive terminal and the disc brush conductive output device, and the output terminal outputs direct current.

2. The disc-type magnetism-increasing DC generator according to claim 1, wherein a round hole is configured in centre of each of the plurality of permanent magnetic disc; and a projection is configured at an outer edge of each of the plurality of permanent magnetic discs.

3. The disc-type magnetism-increasing DC generator according to claim 1, wherein four raised strip-type keys are configured on an outside of the non-magnetic hollow conductive metal shaft.

4. The disc-type magnetism-increasing DC generator according to claim 1, wherein an insulation coil is cast inside the casing.

5. The disc-type magnetism-increasing DC generator according to claim 1, wherein a deep-groove bearing and a thrust bearing are configured inside the bearing bush; the base is provided with a plurality of screw holes and a plurality of fastening screw holes; a bearing bush seat is configured outside the DC generator end cap.

6. The disc-type magnetism-increasing DC generator according to claim 1, wherein the electric brush is configured on the conductive brush disc holder, and the conductive brush disc holder is fixed by an insulation support; the conductive brush disc holder is provided with a wiring terminal; the plurality of fans comprises a positive fan, a negative fan and a motor fan; the positive fan is fixed on the DC generator shaft head, while the negative fan and the motor fan are conductively fixed on the negative conductive disc.

* * * * *